United States Patent [19]
Tsujihara et al.

[11] Patent Number: 5,111,284
[45] Date of Patent: May 5, 1992

[54] DIGITAL CONVERGENCE UNIT FOR ADJUSTING THE CONVERGENCE IN A COLOR DISPLAY SYSTEM

[75] Inventors: Susumu Tsujihara, Neyagawa; Yasuaki Sakanishi, Ibaraki, both of Japan

[73] Assignee: Matsushita Electric Industrial Co., Ltd., Kadoma, Japan

[21] Appl. No.: 622,639

[22] Filed: Dec. 5, 1990

[30] Foreign Application Priority Data

Dec. 8, 1989 [JP] Japan .................................. 1-317443

[51] Int. Cl.$^5$ .............................................. H04N 9/31
[52] U.S. Cl. ........................................ 358/60; 358/51; 358/10; 315/368.11
[58] Field of Search ...................... 358/60, 69, 65, 51, 358/10, 139, 180; 315/368

[56] References Cited

U.S. PATENT DOCUMENTS

| | | | |
|---|---|---|---|
| 4,593,308 | 6/1986 | Kemplin | 358/10 |
| 4,754,204 | 6/1988 | Ando et al. | 315/367 |
| 4,857,998 | 8/1989 | Tsujihara et al. | 358/60 |
| 4,870,329 | 9/1989 | Ara | 315/367 |
| 5,012,332 | 4/1991 | Shiomi et al. | 358/64 |

FOREIGN PATENT DOCUMENTS

| | | |
|---|---|---|
| 60-130188 | 12/1983 | Japan . |
| 62-11388 | 1/1987 | Japan . |
| 63-59191 | 3/1988 | Japan . |
| 63-77288 | 4/1988 | Japan . |
| 1-16192 | 1/1989 | Japan . |
| 9010356 | 9/1990 | PCT Int'l Appl. . |

*Primary Examiner*—Tommy P. Chin
*Assistant Examiner*—Tuan V. Ho
*Attorney, Agent, or Firm*—Spencer & Frank

[57] ABSTRACT

A digital convergence unit detects the aspect ratio of the screen and converts stored convergence correction data in accordance with the detected signal. This can be achieved with high precision and with a small memory capacity. It can also be applied to multimedia by data processing suitable for each scanning frequency.

6 Claims, 10 Drawing Sheets

FIG. 10A
DIRECT VIEWING TYPE

FIG. 10B
PROJECTION TYPE
(REAR-SURFACE PROJECTION)

DIGITAL CONVERGENCE UNIT FOR ADJUSTING THE CONVERGENCE IN A COLOR DISPLAY SYSTEM

BACKGROUND OF THE INVENTION

1. Field of the Invention

The present invention relates to a digital convergence unit for adjusting the convergence of a color television receiver by converting correction data in accordance with changes in the horizontal and vertical frequencies, screen aspect, and horizontal and vertical amplitudes, even if they change after the dynamic convergence has been adjusted.

2. Description of the Related Art

In general, in a projection type color picture receiver which projects expanded color pictures on a screen by using three projection tubes that emit three primary colors, mis-convergence may occur on the screen due to different incident angles of the color rays emitted onto the screen from the respective projection tubes.

The three primary colors, can be registered, or converged, by adjusting the waveform and magnitude of a convergence correction signal, which is an analog signal synchronized with the horizontal and vertical scanning periods. This method, however, has a problem in its convergence precision. In order to solve this problem, there are various proposals for digital convergence units which can provide high convergence precision, such as one that can treat various types of signal sources as disclosed in JP-A-60-130288, or one that can treat various screen aspect ratios as disclosed in JP-A-62-11388.

Figure 11:
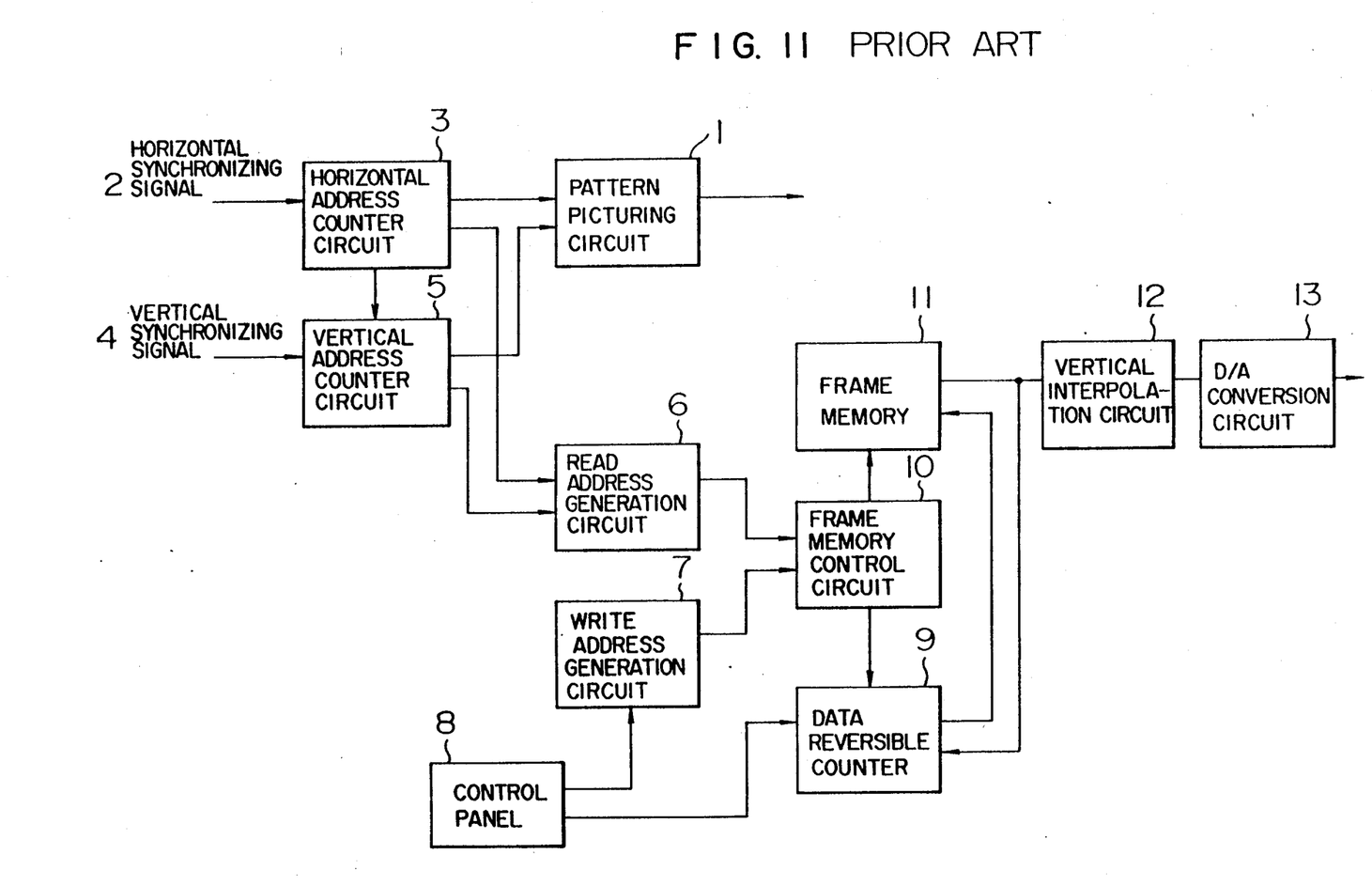
FIG. 11 is a block diagram of a conventional digital convergence unit.

A conventional digital convergence unit will be explained below. FIG. 11 is a block diagram showing the conventional digital convergence unit. This unit produces on the screen a convergence correction pattern such as the cross-hatch pattern shown in FIG. 12, digitally writes convergence correction quantity data for each adjusting point in a frame memory, reads this data out of the memory, interpolates the data between the adjusting points, and converts it from digital to analog, thereby to produce a correction signal for position adjustment of the primary color components over the entire screen. Referring to FIG. 11, 1 designates a pattern picturing circuit, 2 designates a horizontal synchronizing signal, 3 designates a horizontal address counter circuit, 4 designates a vertical synchronizing signal, 5 designates a vertical address counter circuit, 6 designates a read address generation circuit, 7 designates a write address generation circuit, 8 designates a control panel, 9 designates a data reversible counter, 10 designates a frame memory control circuit, 11 designates a frame memory, 12 designates a vertical interpolation circuit, and 13 designates a D/A conversion circuit.

Figure 12:
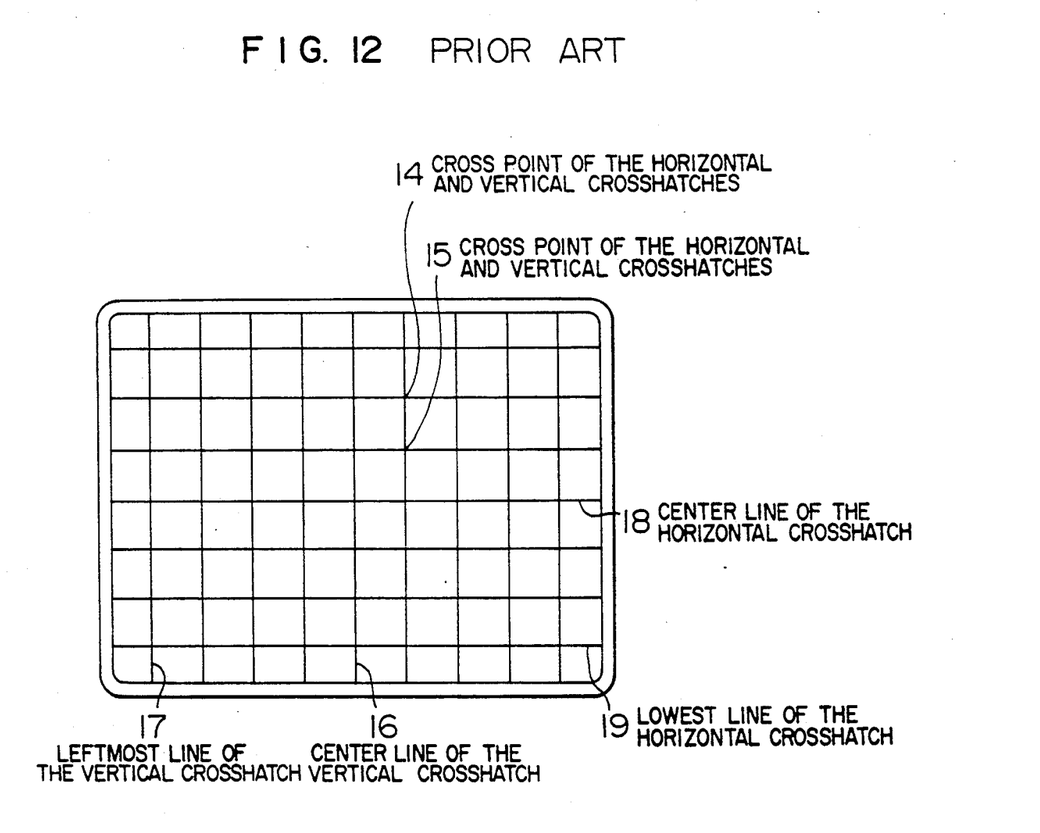
FIG. 12 is a schematic diagram showing a screen for explaining the conventional example.

Next, operation of the above conventional example will be explained. First, as shown in FIG. 12, a cross-hatch signal is emitted by the pattern picturing circuit 1 to display a cross-hatch pattern on the screen. This cross-hatch pattern includes seven horizontal lines and nine vertical lines, for example. A signal for the horizontal direction in the pattern is produced by supplying the horizontal synchronizing signal 2, which is synchronous with the scanning of the screen, to the horizontal address counter circuit 3. Horizontal address counter circuits comprises a PLL (Phase Lock Loop) circuit and a frequency dividing circuit. A vertical direction signal for the pattern is produced by the vertical address counter circuit 5, which is reset by the vertical synchronizing signal 4, and is supplied to the pattern picturing circuit 1 to display the vertical lines on the screen. Next, a cursor key (not shown) on the control panel 8 is used to select a cross point of the cross-hatch signal to be corrected (hereinafter referred to as an adjusting point) and a color (e.g. red) to be corrected. The address of an adjusting point selected by the cursor key is stored in the write address generation circuit 7 and is supplied to the frame memory 11 through the frame memory control circuit 10. The data to be corrected at the adjusting point designated by the cursor key is read from the frame memory 11 and is written in the data reversible counter 9. Further, a write key (not shown) on the control panel 8 is operated to either increase or decrease the content of the data reversible counter 9 to correct the data before it is returned to the frame memory 11.

The reading of the convergence correction data written in the frame memory 11 will now be explained. Horizontal and vertical addresses corresponding to each of the adjusting points on the screen are produced by the horizontal address counter circuit 3 and the vertical address counter circuit 5, which respectively receive the horizontal synchronizing signal 2 and the vertical synchronizing signal 4. The signals 2 and 4 are in synchronism with the scanning period of the screen. The horizontal and vertical addresses are supplied to the read address generation circuit 6, and then applied to the frame memory 11 through the frame memory control circuit 10, thereby to read the correction data at each adjusting point. The frame memory 11 stores correction data only for the positions corresponding to each of the adjusting points. Therefore, for the correction between adjusting points in the vertical direction, interpolation is performed by the vertical interpolation circuit 12. The vertical interpolation circuit 12 comprises a subtraction circuit, a coefficient ROM, a multiplication circuit, and an addition circuit, etc. The vertical interpolation circuit 12 performs an interpolation operation, for example, by using the subtraction circuit to obtain the difference between two adjusting points (i.e. a point 14 in the second row and a point 15 in the third row) based on the correction data, using the multiplication circuit to multiply the difference by a weighting coefficient for each scanning line, the weighing coefficient being written in the coefficient ROM in advance, and using the addition circuit to add the result to the correction data for the point 14 in the second row. The output of the vertical interpolation circuit 12 is converted into an analog quantity by the D/A conversion circuit 13, to obtain a stepped wave shape signal. A signal between the adjusting points in the horizontal direction is adjusted such that the correction quantity at the adjusting points in each line is smoothed out by a low pass filter (not shown) and is supplied to the convergence yoke after being amplified.

As described above, according to the conventional method, each adjusting point can be corrected independent of the others, to ensure convergence correction with high precision.

When the horizontal and vertical frequencies, screen aspect, and horizontal and vertical amplitudes change, adjustments are made in the same manner as described above.

Thus, according to the conventional method, each adjusting point can be corrected independently, and corrections can also be performed for signal sources with different horizontal and vertical frequencies, screen aspects and horizontal and vertical amplitudes, so that convergence correction can be performed with high precision.

However, when the horizontal and vertical frequencies, screen aspect, and horizontal and vertical amplitudes change, positional deviation in the digital convergence adjusting pattern such as cross-hatches may occur on the screen, so that digital convergence correction data cannot be shared. As a result, convergence correction must be repeated each time for the number of images corresponding to the changed patterns, which requires that all the convergence correction data be held.

Although there is an alternative method for sharing data by changing the number of adjusting points by making the number correspond to an aspect ratio, this method involves complex processing in the address system such as for memory writing because the adjusting points change. Therefore, there is the problem that the scale of the circuit needs to be very large.

SUMMARY OF THE INVENTION

It is an object of the present invention to provide a digital convergence unit which converts a single set of digital convergence correction data in accordance with the aspect ratio to perform convergence correction, thereby solving the above-described problems in the conventional art.

In order to achieve the above object, the digital convergence unit of the present invention comprises means for outputting a conversion coefficient for the convergence correction data in accordance with the aspect ratio and means for converting the convergence correction data.

The digital convergence unit further comprises detection means for detecting positional deviations of a pattern with respect to reference positions by using positional detectors provided on the screen, pattern generation means for generating a pattern signal at positions on the screen where the pattern signal can be detected by the detection means, position detection means for detecting the magnitude by the positional deviations with respect to the reference positions based on position signals outputted from the detectors, and means for outputting the conversion coefficient in accordance with the aspect ratio from the position detection means.

In accordance with the present invention, when the aspect ratio has changed, the convergence correction data is controlled so that various signals can be dealt with by a single operation of convergence correction for one image, and convergence correction data for only one image is required to be held. Accordingly, the memory capacity and the scale of the circuit can be reduced, and adjusting the time can also be reduced.

Further, when the aspect ratio has changed, it is possible to automatically treat various signals by detecting the magnitude of positional deviation of the digital convergence correction pattern and the raster size with respect to the reference positions with high precision using the position detectors provided on the screen, converting the digital convergence correction data so as to make it correspond to said various signals in accordance with the magnitude of the positional deviation, and thereby performing convergence correction.

DESCRIPTION OF THE PREFERRED EMBODIMENTS

Figure 1:
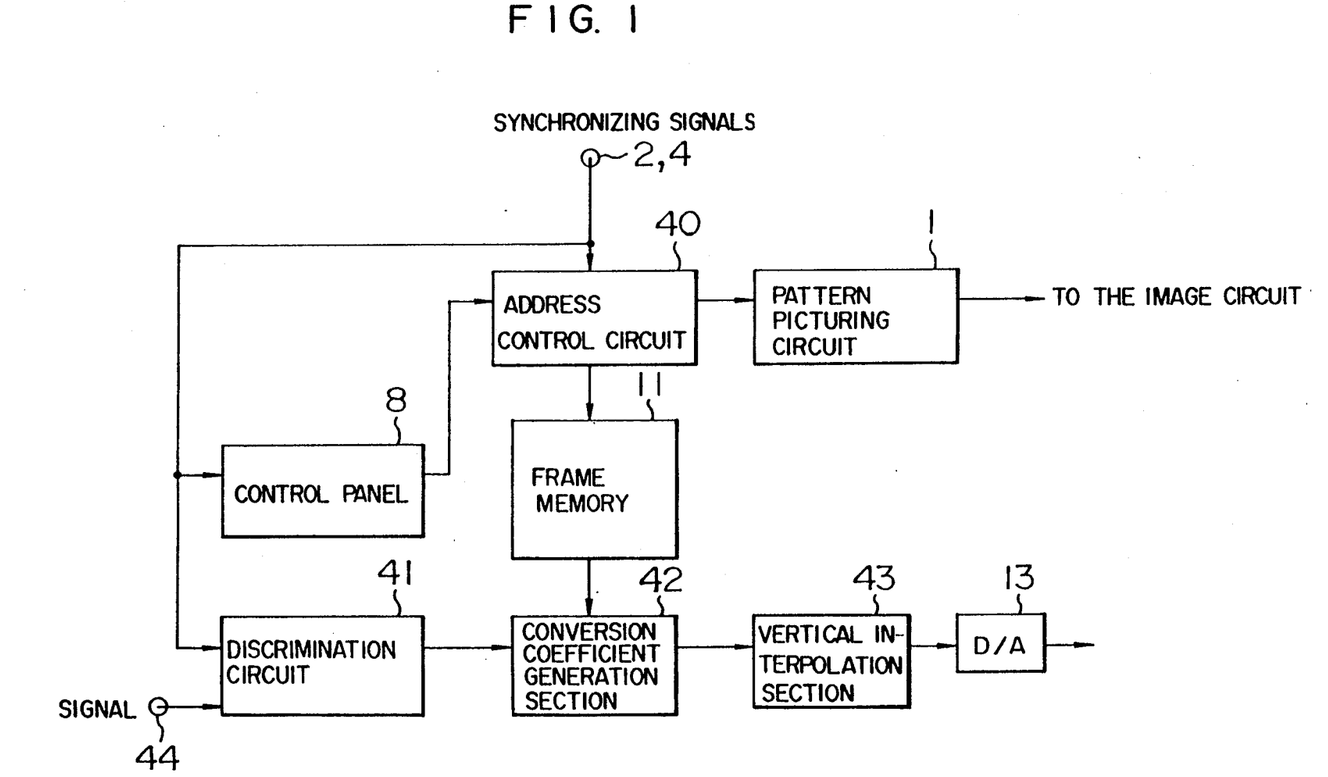
FIG. 1 is a block diagram of a digital convergence unit in an embodiment of the present invention.

An embodiment of the present invention will be explained below with reference to the drawings. FIGS. 1, 3, 4 and 7 are block diagrams of the digital convergence unit in the first embodiment of the present invention. Referring to FIG. 1, 40 designates an address control section for generating various address signals, 41 designates a discrimination circuit for discriminating horizontal and vertical frequencies, screen aspect, and horizontal and vertical amplitudes from an input synchronizing signal and various correction data, 42 designates a conversion coefficient generation section for generating a conversion coefficient to carry out vertical correction with an output signal from said discrimination circuit, 43 designates a vertical correction section for carrying out interpolation in the vertical direction by using said conversion coefficient, and 44 designates a signal input terminal. In the above diagrams, those portions which operate in a similar manner to those in the conventional unit as shown in FIG. 11 are referenced by using the same numerals and their explanation is omitted.

Operation of the digital convergence unit in the first embodiment having the above configuration will be explained next. The discrimination circuit 41 receives signals, including synchronizing signals and picture information, to permit it to discriminate aspect information. The discrimination signal, including aspect information from said discrimination circuit, is supplied to the conversion coefficient generation section 42 to generate a conversion coefficient for vertical correction corresponding to the aspect. The conversion coefficient from the conversion coefficient generation section 42 is supplied to the vertical interpolation section 43, which interpolates between adjusting points to generate correction data.

As described above, correction data corresponding to various aspect ratios can be automatically generated by controlling the conversion coefficient for vertical interpolation.

Figure 2:
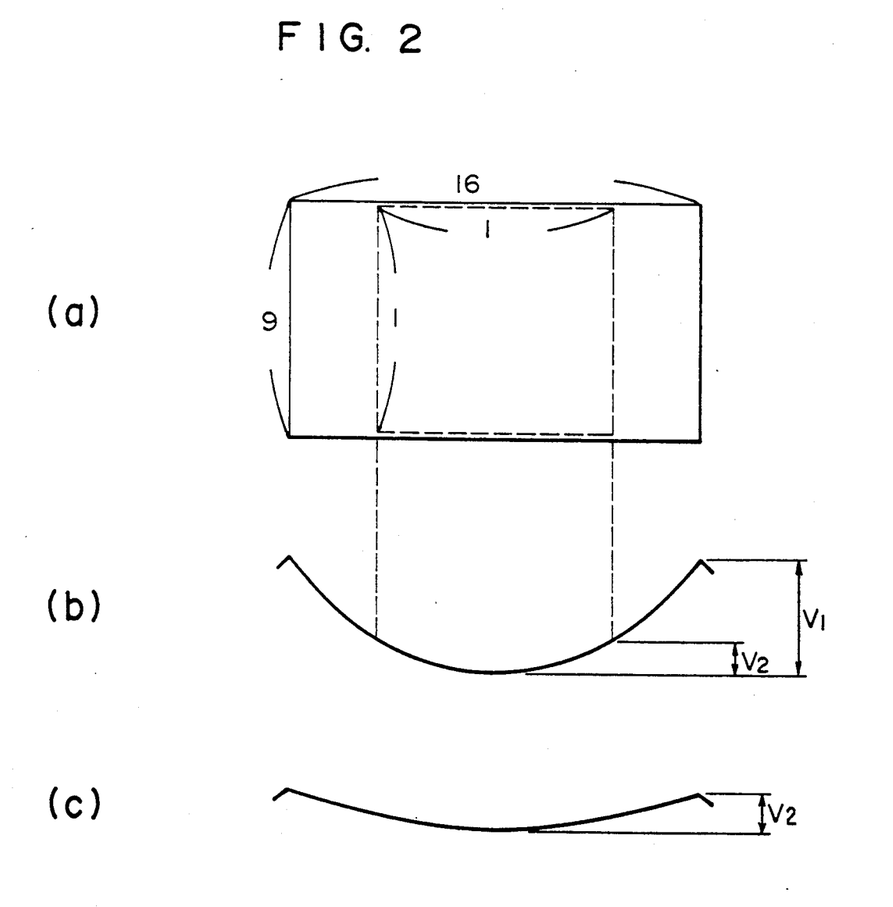
FIGS. 2(a) to 2(c) are schematic diagrams showing a screen and correction waveforms, respectively, for explaining the operation of the above embodiment.

Next, the reason for converting the correction data when the aspect ratio has been changed will be described in detail, with reference to the correction waveform diagrams in FIGS. 2(b) and 2(c). Each correction waveform has a horizontal parabolic waveform. The correction waveform has a maximum amplitude $V_1$ as shown in FIG. 2(b) when the aspect ratio is 16:9, as shown by solid lines in FIG. 2(a). Mis-convergence at the periphery of the screen may occur because of a large spatial correction quantity on the screen, if the horizontal amplitude is lowered to change the aspect ratio from 16:9 to 1:1. Therefore, it becomes necessary to generate a correction waveform in accordance with the horizontal amplitude as shown by the correction waveform having a maximum amplitude $V_2$ shown in FIG. 2(c).

Figure 3:
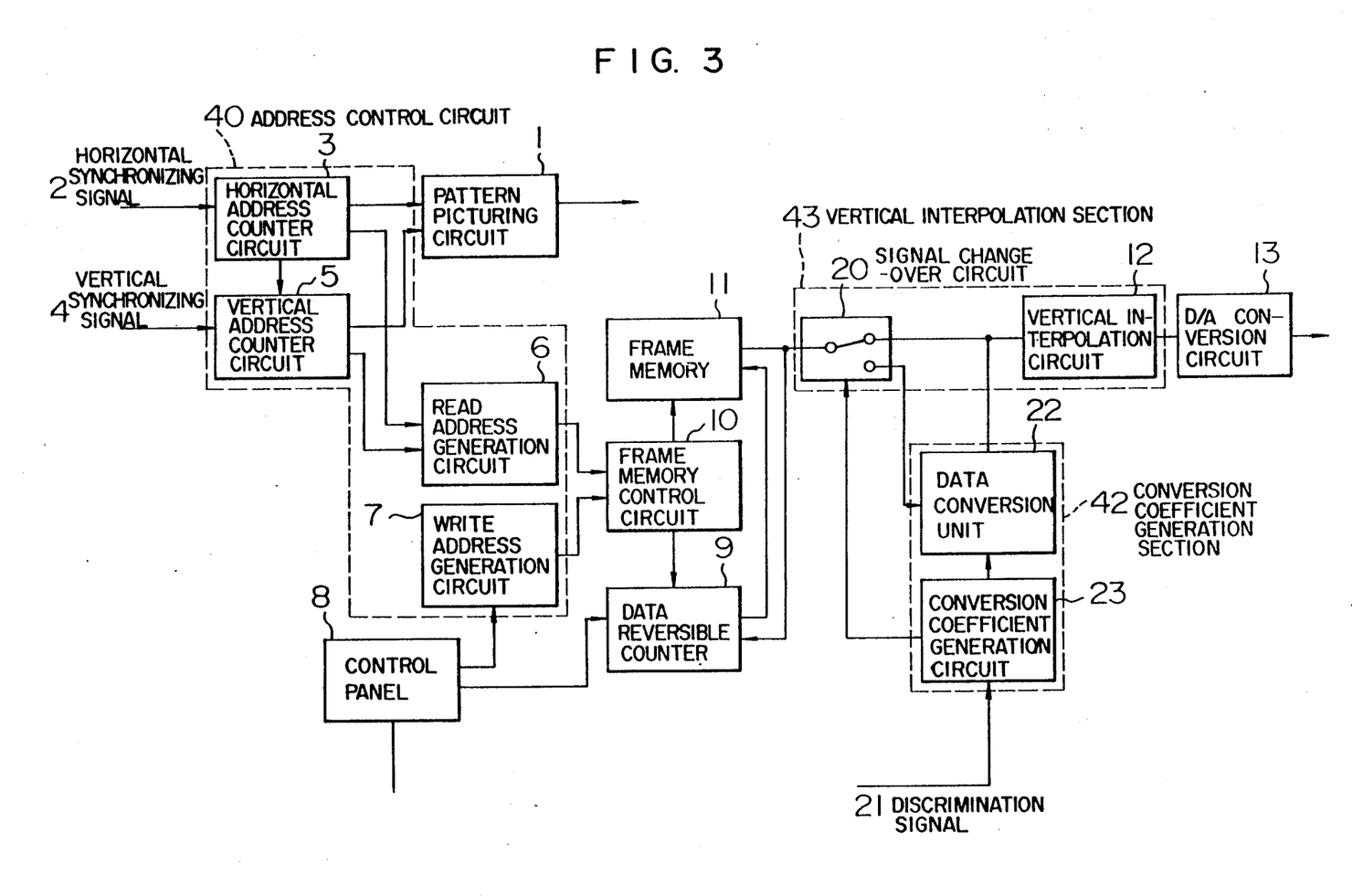
FIG. 3 is a block diagram for explaining the operation of the above embodiment.

Next, the operation of the first embodiment will be explained in further detail with reference to the block diagram shown in FIG. 3. Referring to FIG. 3, the address control circuit 40 comprises a horizontal counter circuit 3, a vertical counter circuit 5, a read address generation circuit 6 and a write address generation circuit 7. The conversion coefficient generation section 42 comprises a conversion coefficient generation circuit 23 and a data conversion unit 22, and the vertical interpolation section 43 comprises a signal switching circuit 20 and a vertical interpolation circuit 12.

In a case where the aspect information included in the discrimination signal 21 from the discrimination circuit 41 shown in FIG. 1 indicates a fundamental aspect ratio, a signal is inputted to the signal change-over circuit 20 to cause it to take the state shown in FIG. 3 (the state where the upper side contact is selected). In this case, the convergence unit of this embodiment works in the same fashion as the conventional digital convergence unit (FIG. 11) does, and convergence adjustment of the whole screen is carried out by a digital convergence circuit. However, if a signal of different ratio is inputted, the change in the aspect ratio is discriminated by the discrimination circuit 41 of FIG. 1. When the discrimination signal 21 is inputted to the conversion coefficient generation circuit 23, the circuit 23 generates a conversion coefficient according to said discrimination signal and a signal for switching the signal change-over circuit 20. The conversion coefficient generation circuit 23 comprises a coefficient ROM and a signal discrimination circuit, and has the following operation. When the discrimination signal 21 is applied, it is discriminated by the signal discrimination circuit, and a digital convergence correction data conversion coefficient stored in ROM in advance is selected and outputted in accordance with the discrimination signal. At the same time, the signal for changing over the signal change-over switch 20 is outputted. The output of the conversion coefficient generation circuit 23 causes the signal change-over circuit 20 to be changed over to the lower side, and the digital convergence correction data outputted from the frame memory 11 is applied to the data conversion unit 22. The conversion coefficient outputted from said conversion coefficient generation circuit 23 is applied to the data conversion unit 22. In the circuit 22, the convergence correction data is multiplied using said conversion coefficient by a multiplication circuit, and the result is converted to digital convergence correction data in accordance with the horizontal and vertical frequencies, screen aspect, and horizontal and vertical amplitudes. The corrected or converted data is outputted to the vertical interpolation circuit 12 and is interpolated by this circuit 12. The interpolated data is converted to an analog signal by the D/A conversion circuit 13, and then the convergence is corrected.

Figure 4:
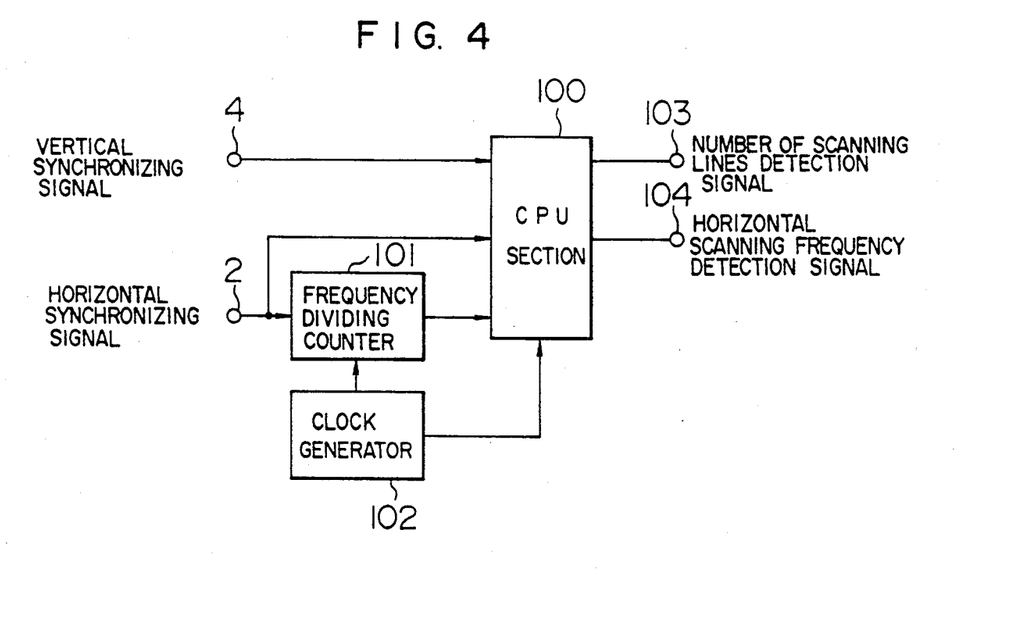
FIG. 4 is a block diagram of a discrimination circuit in the above embodiment.

The discrimination circuit 41 will be explained in detail with reference to the block diagram in FIG. 4. The vertical synchronizing signal 4 is supplied to an input terminal 4 and the horizontal synchronizing signal 2 is supplied to another input terminal. The horizontal synchronizing signal 2 is supplied to a frequency dividing counter 101, along with a clock signal from a CPU clock generator 102. A frequency dividing ratio is obtained by a CPU section 100, which provides a horizontal scanning frequency detection signal at an output terminal 104. The vertical synchronizing signal 4 is directly supplied to the CPU section 100, and the number of occurrences of the horizontal synchronizing signal during the vertical synchronizing signal (that is, a number of scanning lines in one field) is obtained by the CPU section 100. The CPU section 100 provides a scanning line number detection signal at an output terminal 103. The above two types of signals are discriminated by a detection signal to provide a discrimination signal to obtain the aspect ratio.

Figure 5:
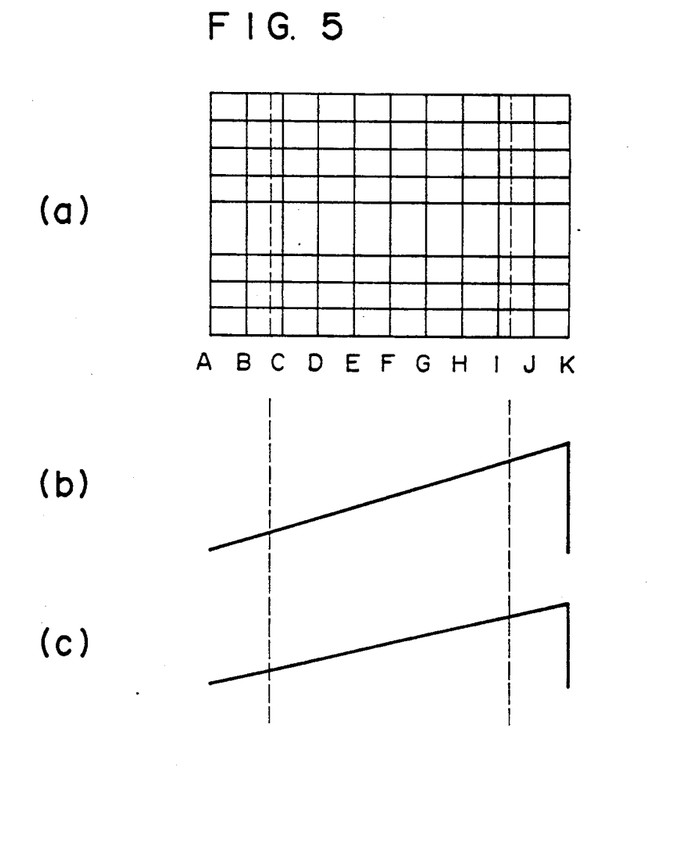
FIGS. 5(a) to 5(c) are schematic diagrams showing a screen and correction waveforms, respectively, for explaining the operation of the above embodiment.

A conversion operation of a correction data will be explained with reference to the schematic diagram of a screen shown in FIG. 5(a) and the waveform diagrams shown in FIGS. 5(b) and 5(c). In the case of an aspect ratio as shown by solid lines in FIG. 5(a), an output from the digital convergence becomes a corrected waveform as shown in FIG. 5(b) with a conversion coefficient $k=1$, for example. In the case of an aspect ratio corresponding to the reduced horizontal amplitude shown by dotted lines in FIG. 5(a), K is set to be 0.5 so that said conversion coefficient becomes smaller. As a result, a corrected waveform with a reduced amplitude is outputted as shown in FIG. 5(c).

Figure 6:
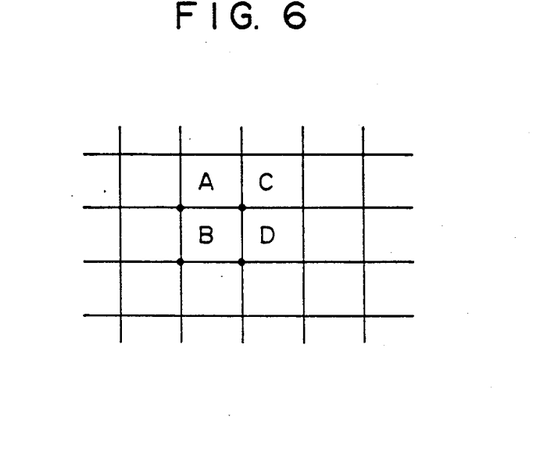
FIG. 6 is a schematic diagram showing a portion of a screen for explaining data conversion in the above embodiment.
Figure 7:
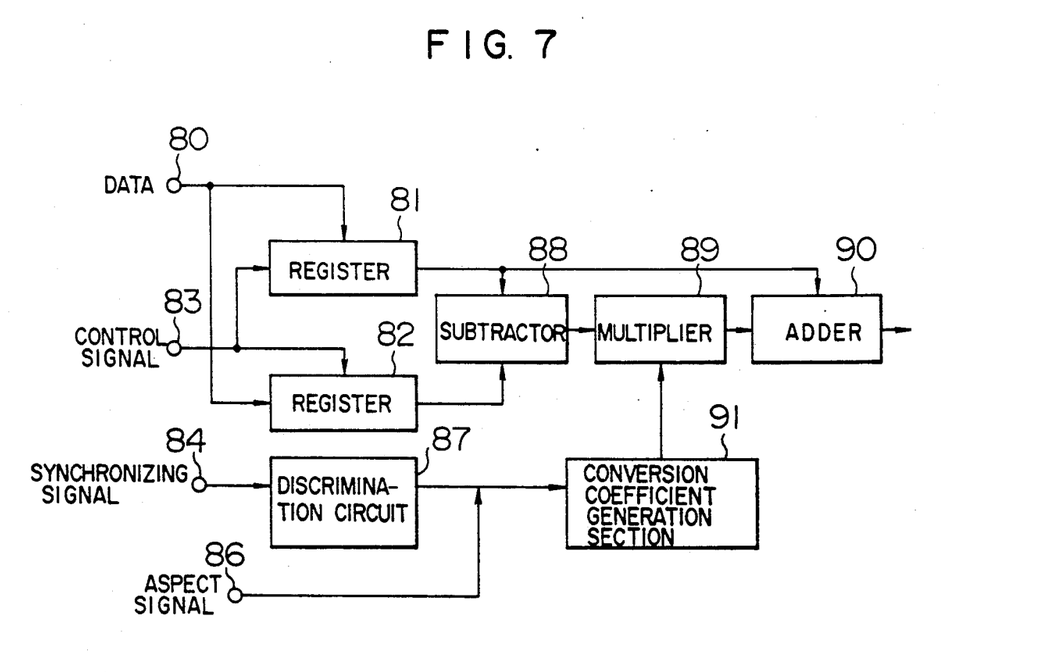
FIG. 7 is a block diagram of the data conversion means in the above embodiment.

Conversion of the convergence correction data will be explained in detail with reference to the diagram showing a screen in FIG. 6 and the block diagram in FIG. 7. Referring to FIG. 6, correction quantities for scanning lines between points A and B and between points C and D can be obtained from expressions $(A-B)k+A$ and $(C-D)k+C$ respectively, where k is a value obtained by linear approximation and is supplied from the conversion coefficient generation section 91. Accordingly, it is clear that k is obtained from the number of scanning lines N between the points A and B. The number of scanning lines N can also be obtained from the number of cross-hatch signals in the vertical direction and the number of scanning lines M in one field.

Convergence data at points A and B are read from the frame memory 11 and stored in registers 81 and 82. Outputs from the registers 81 and 82 are supplied to a subtractor 88. The output from the subtractor 88 and a conversion coefficient k for each scanning line (from the conversion coefficient generation section 91) are supplied to a multiplier 89, where they are multiplied and $(A-B)k$ is obtained. An adder 90 outputs $(A-B)k+A$. A synchronizing signal is supplied to an input terminal 84, and the scanning frequency and number of scanning lines are detected by a discrimination circuit 87 comprising a CPU and the like, so that a detection signal of an aspect ratio is produced. A discrimination signal from the discrimination circuit 87 or an aspect ratio signal from an input terminal 86 is supplied to the conversion coefficient generation section 91 so that a coefficient corresponding to the aspect ratio is generated.

It will now be understood that the convergence correction data can be converted by controlling the coefficient in accordance with aspect ratio information as described above.

As described above, according to the present embodiment, since a change in the aspect ratio of the screen is discriminated, and the convergence correction data is controlled by the discrimination signal, it is sufficient for treating various signal sources to store convergence correction data for one image, and this permits a smaller memory and less circuitry, as well as a shortened adjustment time.

Therefore, when only one set of convergence correction data, for an aspect ratio which serves as a reference, is written in the frame memory, a change in the aspect ratio can also be corrected automatically.

Figure 8:
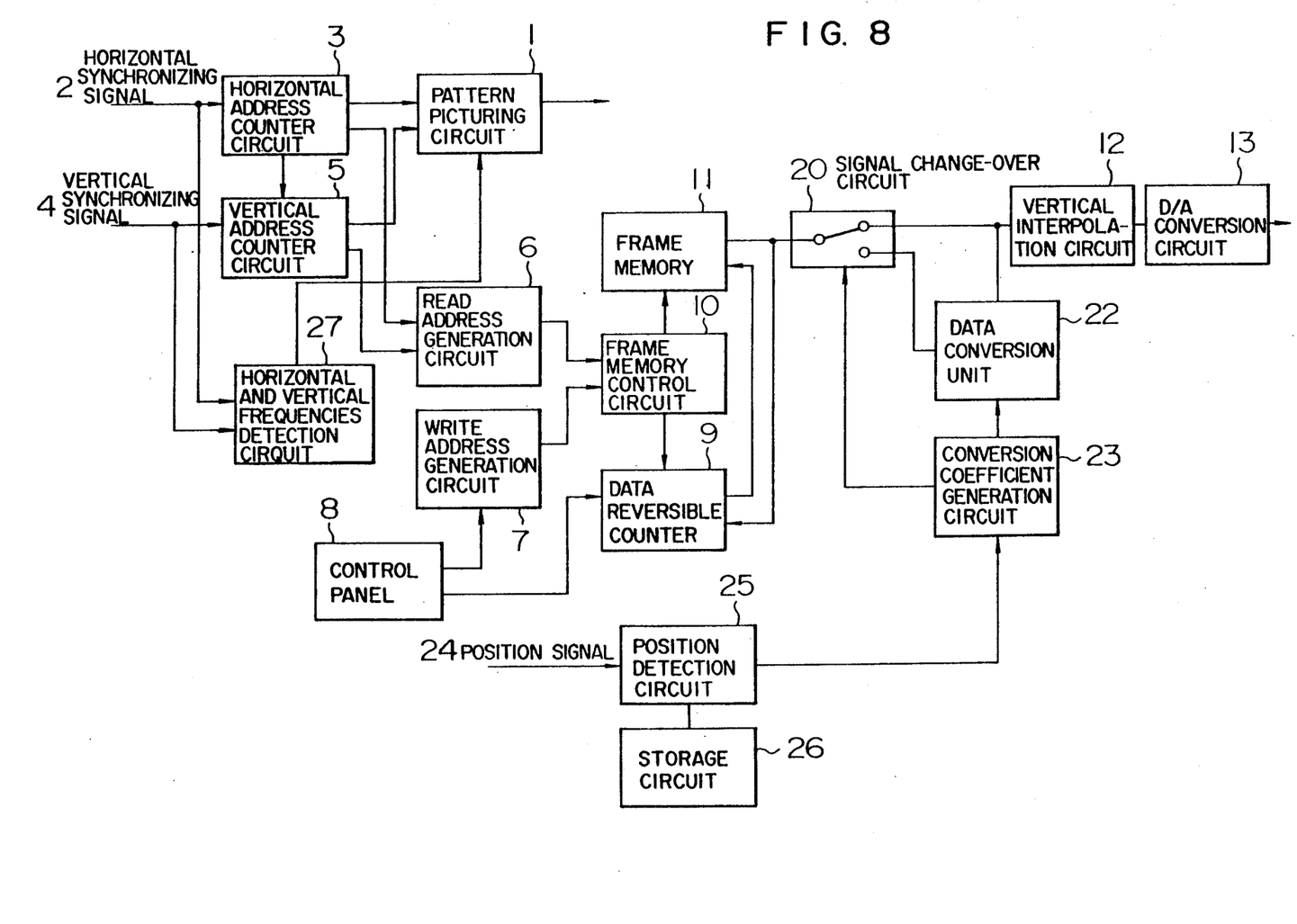
FIG. 8 is a block diagram of a digital convergence unit in a second embodiment of the present invention.
Figure 9A:
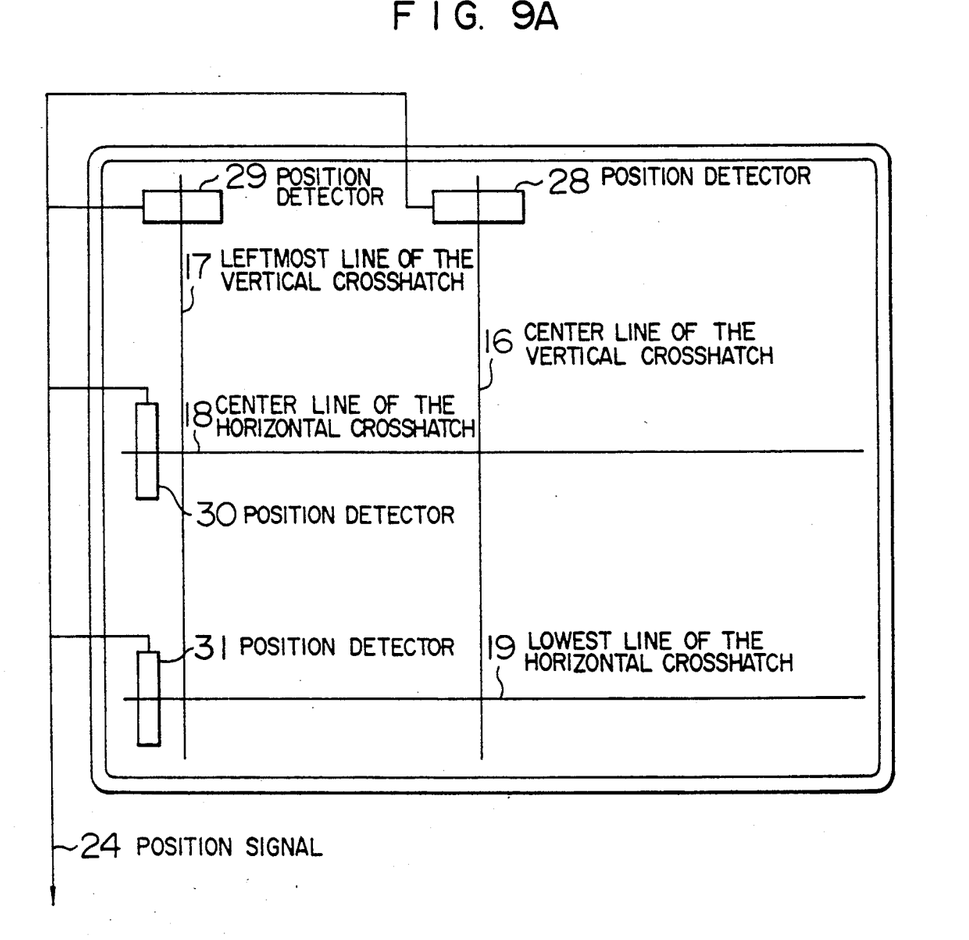
FIG. 9A is a schematic diagram showing a screen for explaining the operation of the above embodiment.
Figure 9B:
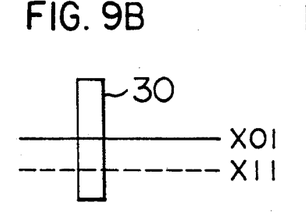
FIGS. 9B to 9E show various detection operations by position detectors.
Figure 9C:
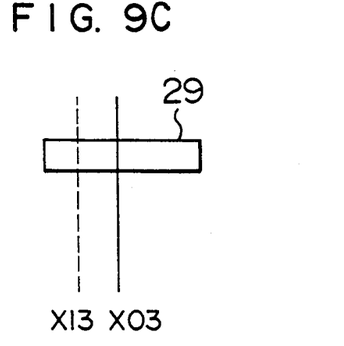
Figure 9D:
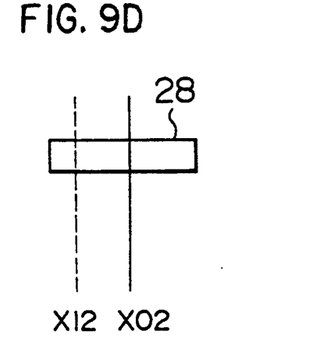
Figure 9E:
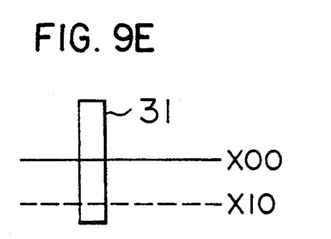

FIGS. 8, 9A and 9B show a block diagram and a cross-hatch position detection operation diagram respectively of a digital convergence unit in the second embodiment of the present invention. The second embodiment is different from the first embodiment in that the aspect ratio is automatically detected in the second embodiment. Referring to FIG. 9A, 16 designates a center line of a vertical cross-hatch, 17 designates a leftmost line of the vertical cross-hatch, 18 designates a center line of a horizontal cross-hatch, 19 designates a lowest line of the horizontal cross-hatch, 28, 29, 30 and 31 designates position detectors for each of said crosshatch lines, and 24 designates a position signal from said position detectors. Referring to FIG. 8, 25 designates a position detection circuit for receiving the position signal 24, 26 designates a storage circuit for storing a position detected by the position detection circuit 25, and 27 designates a horizontal and vertical frequency detection circuit. In FIG. 8, those portions performing the same operations as those in the first embodiment are referenced by the same numerals for which description is omitted here.

Operation of the digital convergence unit in the second embodiment having the above configuration will be explained below. The horizontal synchronizing signal 2 and the vertical synchronizing signal 4, respectively of a fundamental aspect ratio, are applied to the horizontal and vertical frequency detection circuit 27. The input is discriminated by said horizontal and vertical frequency detection circuit 27 and said discrimination signal is outputted to the pattern picturing circuit 1. A convergence adjusting or correction pattern for dividing the screen horizontally and vertically at equal intervals in accordance with said signal is outputted from the pattern picturing circuit 1. On the screen, the pattern is produced as shown in FIG. 12. The above pattern is the same as that of the conventional method. The digital convergence unit of the present embodiment will be explained in detail with reference to FIG. 9A. FIG. 9A shows pattern lines that are also illustrated in FIG. 12. In FIG. 9A, pattern lines 16, 17, 18 and 19 outputted from the pattern picturing circuit 1 are produced as images on the position detectors 28, 29, 30 and 31. The center line 16 of the vertical cross-hatch, the leftmost line 17 of the vertical cross-hatch, the center line 18 of the horizontal cross-hatch and the lowest line 19 of the horizontal cross-hatch produce position signals 24 from the position detectors 28, 29, 30 and 31 respectively. These outputs from the detectors are detected at each position as position data of the fundamental aspect ratio X00 to X03 (FIG. 9B) by the position detection circuit 25, and are stored in the storage circuit 26 respectively. A discrimination signal of the fundamental aspect ratio is produced by the position detection circuit 25 and is applied to the conversion coefficient generation circuit 23, which is the same as the circuit in the first embodiment. As a result, convergence adjustment of the screen as a whole is performed by the digital convergence circuit or by an analog convergence circuit in the same manner as the conventional method.

When a signal of different aspect ratio is inputted, the position of the pattern signal on the screen deviates. Positional deviations are detected, as deviated positions X10 to X13 (FIG. 9B), by the position detection circuit 25. The position detection circuit 25 compares the positional deviation with the data of the fundamental aspect ratio stored in the storage circuit 26, to detect the magnitude of the positional deviation and discriminate the signal. The discriminated signal is outputted to the conversion coefficient circuit 23 and the digital convergence correction data is converted to perform convergence adjustment.

Figure 10A:
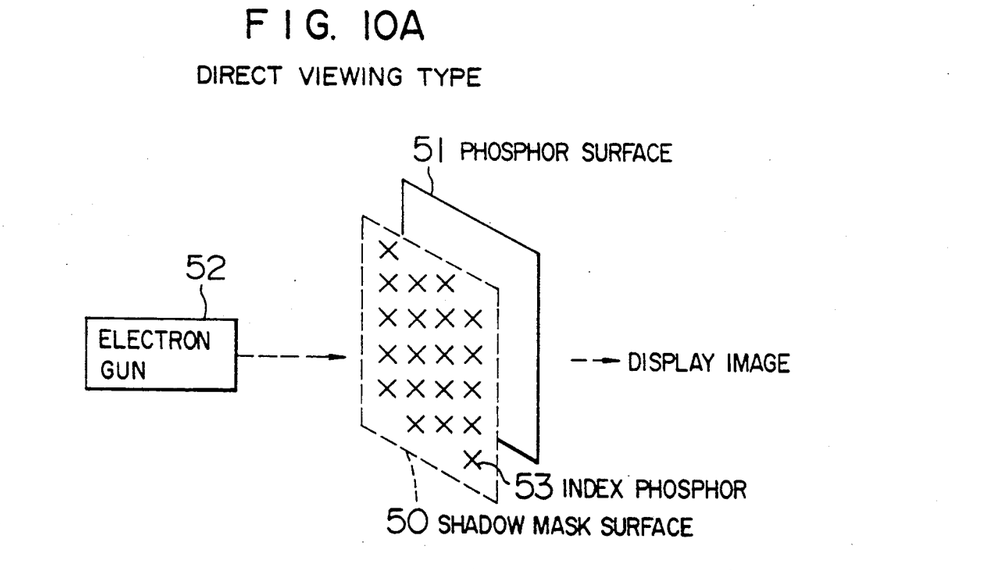
FIGS. 10A and 10B are perspective diagrams schematically illustrating position detectors in a direct type system and a projection type system, respectively, in the above embodiment.
Figure 10B:
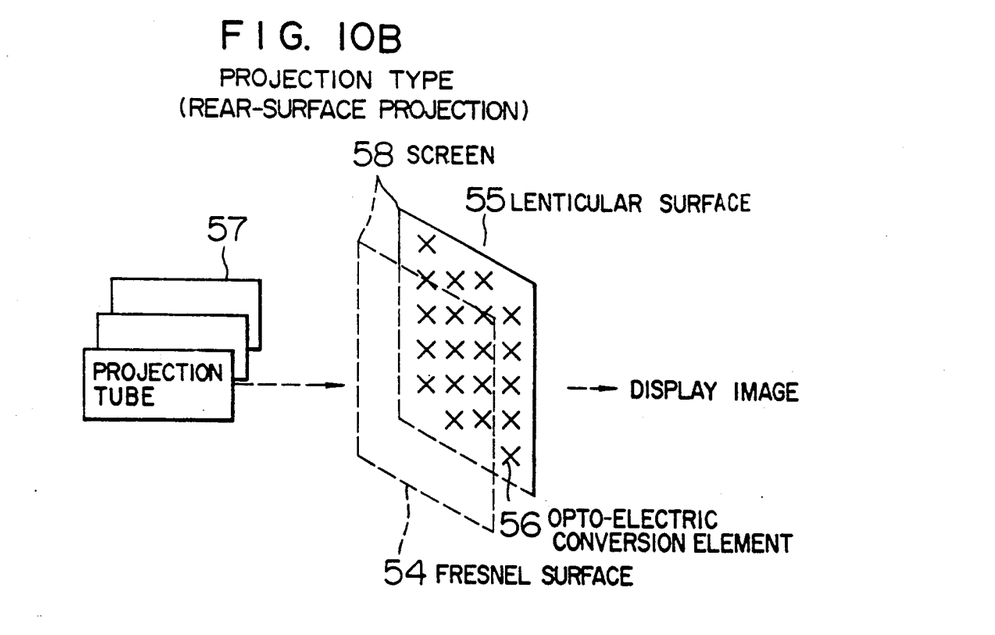

Next, methods of installing the position detectors on the screen will be explained in detail with reference to FIGS. 10A and 10B. FIGS. 10A and 10B are diagrams based on a direct viewing type screen and a rear-surface projection type screen respectively. In the case of the direct viewing type in FIG. 10A, electron beams of three primary colors emitted from an electron gun 52 are deflected and then focussed on the surface of a shadow mask 50. The shadow mask 50 and a phosphor surface 51 are arranged almost parallel with each other. Phosphor dots for three colors R, G and B are arranged behind each one of holes on the shadow mask and are coated on the phosphor screen. Electron beams which pass through each hole of the shadow mask are thereby restricted. The restricted beams can stimulate the phosphor dots of the three colors R, G and B so that a picture is obtained. The position detectors are structured as follows: A plurality of index phosphors 53 are coated on the shadow mask surface 50 and are not influenced by the displayed image, thereby to detect position. However, the index phosphors 53 may be coated at position which are not influenced by electron beams.

In the case of the rear-surface projection type shown in FIG. 10B, projection tubes 57 project images in the three principal colors on to a screen 58 which is structured by a Fresnel surface 54 and a lenticular surface 55, so that a picture is obtained. The position detectors are structured as follows: A plurality of opto-electric conversion elements 56 are disposed on a black matrix surface provided on the lenticular surface 55, thereby to detect positions. The number of position detectors shown in the diagram corresponds to the positions of the digital convergence adjusting points. The magnitude of the positional deviations are detected to automatically carry out convergence correction. Then, raster sizes and test signals are produced in images which are used for detecting the aspect ratio. A conversion coefficient corresponding to each aspect ratio is obtained to automatically generate correction data as described above.

According to the present embodiment, the aspect ratio (the horizontal to vertical amplitude ratio) on the screen is directly detected as described above, so that high-precision convergence correction can be automatically carried out for each aspect ratio. Further, the scanning frequencies are detected and they are processed to match the detection signal so that the method can also be applied to a signal source of different scanning frequency.

In the above two embodiments, a display unit using at least one CRT has been described to facilitate understanding. However, it is needless to mention that the present invention can also be applied to other display units as well.

In the above first embodiment, a way to detect the aspect ratio by discriminating it from an input synchronizing signal has been described. However, discriminating of the aspect ratio can also be carried out by supplying an aspect control signal from the outside or by supplying the signal by multiplexing it with each signal.

In the second embodiment, the positions for installing position detection elements to detect the aspect ratio have been described as being the shadow mark surface for a direct viewing type system or a lenticular black matrix surface for a rear-surface projection system. However, the position detection elements can also be installed at other positions as long as they are not influenced by an image signal.

We claim:

1. A digital convergence unit for use with a display means for displaying images with three primary color components on a screen, said digital convergence unit comprising:
   a frame memory means for storing correction data, each representative of a reference convergence correction quantity at a respective one of a plurality of adjusting points defined on said screen;
   extraction means for extracting aspect ratio information from an input signal;
   conversion coefficient generation means for generating a converstion coefficient based on said aspect ratio information;
   conversion means for generating converted correction data from said conversion coefficient and correction data read out of said frame memory means; and
   correction signal generation means, responsive to said converted correction data, for generating an adjustment signal used for position adjustment of said primary color components over the entire screen, said correction signal generation means including means for interpolating said converted correction data between adjusting points over the entire screen.

2. A digital convergence unit according to claim 1, wherein said extraction means extracts said aspect ratio information from an input synchronizing signal.

3. A digital covnergence unit according to claim 1, wherein said aspect ratio information includes horizontal and vertical frequencies, a screen aspect ratio, and horizontal and vertical amplitudes.

4. A digital convergence unit according to claim 1, wherein said correction signal generation means is additionally responsive to correction data read from said frame memory means, and further comprises signal change-over means for selectively providing either correction data read from said frame memory means or converted correction data to said means for interpolating.

5. A digital convergence unit for use with a display means for displaying images with three primary color components on a screen, said digital convergence unit comprising:
   a frame memory means for storing correction data, each representative of a reference convergence correction quantity at a respective one of a plurality of adjusting points defined on said screen;
   pattern generation means for generating a pattern signal defined at each of said adjusting points;
   position detection means, having a plurality of position detectors to detect said pattern signal displayed on the screen, for determining positional deviations of the displayed pattern with respect to reference positions on said screen where said position detectors are disposed, said positional deviations being representative of a screen aspect ratio;
   conversion coefficient generation means for generating a conversion coefficient based on said positional deviations;
   conversion means for generating converted correction data from said conversion coefficient and correction data read out of said frame memory means; and
   correction signal generation means, responsive to said converted correction data, for generating an adjustment signal used for position adjustment of said primary color components over the entire screen, said correction signal generation means including means for interpolating said converted correction data between adjusting points over the entire screen.

6. A digital convergence unit according to claim 5, wherein said correction signal generation means is additionally responsive to correction data read from said frame memory means, and further comprises signal change-over means for selectively providing either correction data read from said frame memory means or converted correction data to said means for interpolating.

* * * * *